United States Patent
Saruwatari et al.

(10) Patent No.: US 11,131,233 B2
(45) Date of Patent: Sep. 28, 2021

(54) MARINE VESSEL PROPULSION DEVICE

(71) Applicant: YAMAHA HATSUDOKI KABUSHIKI KAISHA, Iwata (JP)

(72) Inventors: Kimitaka Saruwatari, Iwata (JP); Yuhei Suzuki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/039,290

(22) Filed: Sep. 30, 2020

(65) Prior Publication Data
US 2021/0102489 A1   Apr. 8, 2021

(30) Foreign Application Priority Data

Oct. 2, 2019 (JP) .............................. JP2019-182279

(51) Int. Cl.
| C23F 13/00 | (2006.01) |
| B63H 20/28 | (2006.01) |
| F01P 11/06 | (2006.01) |

(52) U.S. Cl.
CPC ............ F01P 11/06 (2013.01); B63H 20/285 (2013.01); C23F 13/005 (2013.01); *F01P 2011/066* (2013.01)

(58) Field of Classification Search
CPC .. C23F 2213/31; C23F 13/22; C23F 2213/21; C23F 13/16; B63H 20/285; F01P 11/06; F01P 2011/066; F01P 3/202
See application file for complete search history.

(56) References Cited

U.S. PATENT DOCUMENTS

| 3,671,322 A | * | 6/1972 | King | H01M 6/36 429/103 |
| 3,830,719 A | * | 8/1974 | Cavil | C23F 13/04 204/196.02 |
| 5,350,494 A | * | 9/1994 | Brummelhuis | C23F 13/04 204/196.05 |
| 2006/0054072 A1 | * | 3/2006 | Sica | B63B 59/00 114/222 |
| 2008/0169205 A1 | * | 7/2008 | Kim | G01N 17/04 205/775.5 |
| 2010/0252424 A1 | | 10/2010 | Amano et al. | |
| 2010/0270169 A1 | * | 10/2010 | Howard | C23F 13/04 205/727 |

(Continued)

FOREIGN PATENT DOCUMENTS

| JP | 2005162187 A | 6/2005 |
| JP | 2011105273 A | 6/2011 |

*Primary Examiner* — Long T Tran
(74) *Attorney, Agent, or Firm* — Rabin & Berdo, P.C.

(57) ABSTRACT

A marine vessel propulsion device having a metal component in contact with water. The marine vessel propulsion device includes an anticorrosive anode made of a metal material that is less corrosion-resistant than the metal component, is electrically connected to the metal component, and is disposed in contact with the water contacting the metal component, a primary reference electrode isolated from the metal component and the anticorrosive anode, and disposed in contact with the water contacting the metal component, and a potentiometer that detects a potential difference of the metal component or the anticorrosive anode with respect to the primary reference electrode.

14 Claims, 6 Drawing Sheets

(56) References Cited

U.S. PATENT DOCUMENTS

| | | | |
|---|---|---|---|
| 2012/0189425 A1* | 7/2012 | Moors | C23F 13/06 |
| | | | 415/1 |
| 2014/0015551 A1* | 1/2014 | Russ | G01N 27/06 |
| | | | 324/693 |
| 2017/0071312 A1* | 3/2017 | Sugunan | A45D 7/04 |
| 2017/0198401 A1* | 7/2017 | Phillips | C25B 9/19 |

* cited by examiner

MARINE VESSEL PROPULSION DEVICE

CROSS REFERENCE TO RELATED APPLICATIONS

This application claims the benefit of priority to Japanese Patent Application No. 2019-182279 filed on Oct. 2, 2019. The entire contents of this application are hereby incorporated herein by reference.

BACKGROUND OF THE INVENTION

1. Field of the Invention

The present invention relates to a marine vessel propulsion device having a metal component in contact with water.

2. Description of the Related Art

US 2010/0252424 A1 discloses an anode metal (sacrificial anode) for an outboard motor engine. The anode metal is attached to a cylinder block, and is disposed in contact with cooling water in a water jacket (cooling water channel) provided in the cylinder block. The anode metal is made of a metal which is more liable to be ionized than the cylinder block and has a negative potential. This makes the anode metal more susceptible to corrosion than the cylinder block, thereby suppressing the corrosion of the cylinder block.

As the anode metal is consumed, the cylinder block corrosion preventing effect is reduced. Therefore, it is necessary to replace the anode metal before the consumption of the anode metal reaches a predetermined level.

SUMMARY OF THE INVENTION

The inventor of preferred embodiments of the present invention described and claimed in the present application conducted an extensive study and research regarding a marine vessel propulsion device, such as the one described above, and in doing so, discovered and first recognized new unique challenges and previously unrecognized possibilities for improvements as described in greater detail below.

The consumption of the anode metal depends upon the operating state of the outboard motor. More specifically, the consumption of the anode metal depends upon the water temperature and the water flow inside the water jacket, and further depends upon the salt concentration of the cooling water. Therefore, it is not easy to predict the time for the replacement of the anode metal.

In general, the anode metal is inspected and replaced every predetermined period of time (e.g., every year, or every 100-hour operation period).

However, the anode metal includes a plurality of anode metals provided in different portions of the water jacket, so that it is necessary to disassemble the outboard motor for the inspection and the replacement. Therefore, time and costs are correspondingly required for the disassembling. Even if the outboard motor is disassembled, there would be a possibility that the replacement of the anode metal is not necessary because the consumption of the anode metal is slight depending upon the operating state of the outboard motor.

In order to overcome the previously unrecognized and unsolved challenges described above, one preferred embodiment of the present invention provides a marine vessel propulsion device having a configuration which allows for easy and accurate prediction of the time for the replacement of an anticorrosive anode (anode metal).

According to a preferred embodiment of the present invention, a marine vessel propulsion device having a metal component in contact with water is provided, which includes: an anticorrosive anode made of a metal material less noble than the metal component, electrically connected to the metal component, and disposed in contact with the water contacting the metal component; a primary reference electrode isolated from the metal component and the anticorrosive anode, and disposed in contact with the water contacting the metal component; and a potentiometer that detects a potential difference of the metal component or the anticorrosive anode with respect to the primary reference electrode.

With this arrangement, the anticorrosive anode electrically connected to the metal component serves as a sacrificial anode to provide a so-called cathode anticorrosion effect, whereby the corrosion of the metal component can be suppressed.

On the other hand, the primary reference electrode isolated from the metal component and the anticorrosive anode is disposed in contact with the water contacting the metal component in the marine vessel propulsion device. The potential difference of the metal component or the anticorrosive anode with respect to the primary reference electrode is acquired or detected by the potentiometer.

With the metal component and the anticorrosive anode electrically connected to each other, the potential of the metal component and the potential of the anticorrosive anode are a midpoint potential between the natural potential of the metal component and the natural potential of the anticorrosive anode. As the anticorrosive anode is corroded to be consumed, the midpoint potential increases to approach the natural potential of the metal component. On the other hand, the potential of the primary reference electrode isolated from the metal component and the anticorrosive anode is not influenced by the consumption of the anticorrosive anode.

Therefore, the difference of the potential of the metal component or the anticorrosive anode (the midpoint potential described above) with respect to the potential of the primary reference electrode is acquired or detected. The potential difference is correlated with the consumption state of the anticorrosive anode and, therefore, the time for the inspection and the replacement of the anticorrosive anode can be determined based on the potential difference. Since the primary reference electrode is provided in the marine vessel propulsion device, the potential difference can be easily measured as required. Therefore, the time for the inspection and the replacement of the anticorrosive anode can be easily determined. That is, there is no need to disassemble the marine vessel propulsion device for the inspection of the anticorrosive anode, but the marine vessel propulsion device may be disassembled as required after it is confirmed that the replacement of the anticorrosive anode is necessary.

In a preferred embodiment of the present invention, the primary reference electrode is made of a metal material which has a higher potential than the metal component when the anticorrosive anode has a normal anticorrosive function.

The potentials of the primary reference electrode, the metal component, and the anticorrosive anode may vary depending upon the quality of the water, the temperature of the water, and other environmental factors. The material for the primary reference electrode is selected so that the potential differences of the metal component and the anticorrosive anode with respect to the primary reference electrode can be properly provided in a normal state even with the potential variations due to the environmental factors, whereby measurement can be performed to accurately determine the time for the inspection and the replacement of the anticorrosive anode.

In a preferred embodiment of the present invention, the primary reference electrode contains the same metal material as the metal component or a metal material that is nobler than the metal component.

Where the primary reference electrode is made of the same metal material as the metal component and the anticorrosive function of the anticorrosive anode is normal, the potential of the metal component and the potential of the anticorrosive anode connected to the metal component are lower than the potential of the primary reference electrode, and are higher than the potential (i.e., natural potential) of the anticorrosive anode present independently. Similarly, where the primary reference electrode is made of the metal material nobler than the metal component and the anticorrosive function of the anticorrosive anode is normal, the potential of the metal component and the potential of the anticorrosive anode connected to the metal component are lower than the potential of the primary reference electrode, and are higher than the potential of the anticorrosive anode present independently. Therefore, the potential differences of the metal component and the anticorrosive anode with respect to the primary reference electrode can be properly provided in the normal state and, hence, can be properly measured so as to accurately determine the time for the inspection and the replacement of the anticorrosive anode.

Where the primary reference electrode is made of the same metal material as the metal component, potential variations of the primary reference electrode and the metal component due to the temperature and the conductivity of the water, and other environmental factors occur in substantially the same manner. This makes it possible to compensate for the influence of the potential variations due to the environmental factors and, hence, to accurately determine the time for the inspection and the replacement of the anticorrosive anode. In addition, this arrangement is less costly than an arrangement in which a special electrode material is used for the primary reference electrode.

In a preferred embodiment of the present invention, the marine vessel propulsion device further includes a secondary reference electrode made of a metal material having a lower potential than the metal component and the anticorrosive anode when the anticorrosive function of the anticorrosive anode is normal, the secondary reference electrode being isolated from the metal component, the anticorrosive anode, and the primary reference electrode, and disposed in contact with the water contacting the metal component. Further, the potentiometer includes a microcomputer programmed to detect a potential difference of the primary reference electrode with respect to the secondary reference electrode and a potential difference of the metal component or the anticorrosive anode with respect to the secondary reference electrode, and compute the potential difference of the metal component or the anticorrosive anode with respect to the primary reference electrode based on the potential differences with respect to the secondary reference electrode.

With this arrangement, the secondary reference electrode isolated from the metal component, the anticorrosive anode, and the secondary reference electrode is provided in addition to the primary reference electrode. Where the anticorrosive function of the anticorrosive anode is normal, the primary reference electrode has a higher potential than the metal component and the anticorrosive anode, and the secondary reference electrode has a lower potential than the metal component and the anticorrosive anode. Therefore, the potential difference of the primary reference electrode with respect to the secondary reference electrode is positive, and the potential difference of the metal component or the anticorrosive anode with respect to the secondary reference electrode is also positive. Based on these positive potential differences, the microcomputer computes the potential difference (negative potential difference) of the metal component or the anticorrosive anode with respect to the primary reference electrode. That is, the microcomputer is not required to perform complicated computation, because only positive values are handled. Accordingly, a less expensive microcomputer can be used as the microcomputer. This makes it possible to reduce the costs, while ensuring accurate determination of the time for the inspection and the replacement of the anticorrosive anode.

In a preferred embodiment of the present invention, the secondary reference electrode contains the same metal material as the anticorrosive anode or a metal material that is less noble than the anticorrosive anode.

The potentials of the secondary reference electrode, the metal component, and the anticorrosive anode may vary depending upon the quality of the water, the temperature of the water, and other environmental factors. The material for the secondary reference electrode is selected so that the potential differences of the metal component and the anticorrosive anode with respect to the secondary reference electrode can be properly provided in the normal state even with the potential variations due to the environmental factors, whereby the measurement can be performed to accurately determine the time for the inspection and the replacement of the anticorrosive anode.

Where the secondary reference electrode is made of the same material as the anticorrosive anode and the anticorrosive function of the anticorrosive anode is normal, the potential of the metal component and the potential of the anticorrosive anode connected to the metal component are higher than the potential of the secondary reference electrode, and are higher than the potential (i.e., natural potential) of the anticorrosive anode present independently. Similarly, where the secondary reference electrode is made of the metal material less noble than the anticorrosive anode and the anticorrosive function of the anticorrosive anode is normal, the potential of the metal component and the potential of the anticorrosive anode connected to the metal component are higher than the potential of the secondary reference electrode, and are higher than the potential of the anticorrosive anode present independently. Therefore, the potential differences of the metal component and the anticorrosive anode with respect to the secondary reference electrode can be properly provided in the normal state and, hence, can be properly measured so as to accurately determine the time for the inspection and the replacement of the anticorrosive anode.

In a preferred embodiment of the present invention, the metal component includes a cooling water channel (water jacket) through which cooling water flows to cool an engine, and the primary reference electrode is disposed in contact with the cooling water flowing through the cooling water channel.

Where the metal component includes the cooling water channel (water jacket), the anticorrosive anode is disposed in contact with the cooling water flowing through the cooling water channel. With the primary reference electrode disposed in contact with the cooling water flowing through the cooling water channel, the potential differences can be properly measured to determine the time for the inspection and the replacement of the anticorrosive anode disposed in the cooling water channel. Since it is difficult to externally check the anticorrosive anode incorporated in the cooling water channel, the determination of the time for the inspection and the replacement without the disassembling of the marine vessel propulsion device is highly beneficial to the user and maintenance personnel.

In a preferred embodiment of the present invention, the anticorrosive anode includes an anticorrosive anode fixed to the metal component in contact with the cooling water flowing through the cooling water channel, and the primary reference electrode is disposed close to the anticorrosive anode.

With this arrangement, the primary reference electrode is disposed close to the anticorrosive anode (e.g., within a distance of 500 mm, preferably within a distance of 300 mm, more preferably within a distance of 200 mm, typically at a distance of 200 mm to 300 mm, from the anticorrosive anode) in the cooling water channel, whereby the potential differences indicating the accurate consumption state of the anticorrosive anode can be measured. Thus, the measurement can be accurately performed to properly determine the time for the inspection and the replacement of the anticorrosive anode.

In a preferred embodiment of the present invention, the metal component includes a bracket or a casing which contacts water surrounding the marine vessel propulsion device during the sailing of the marine vessel, and the primary reference electrode is disposed in contact with the surrounding water contacting the bracket or the casing.

With this arrangement, the bracket or the casing provided as the metal component contacts the water surrounding the marine vessel propulsion device and, therefore, the anticorrosive anode is disposed in contact with the surrounding water. Typically, the anticorrosive anode is exposed to the outside of the marine vessel propulsion device. In this case, with the primary reference electrode disposed in contact with the surrounding water contacting the bracket or the casing, the potential difference of the metal component or the anticorrosive anode with respect to the primary reference electrode is accurately correlated with the consumption state of the anticorrosive anode. Thus, the potential difference can be accurately measured to determine the time for the inspection and the replacement of the anticorrosive anode.

In a preferred embodiment of the present invention, the marine vessel propulsion device further includes a notification unit that compares the potential difference detected by the potentiometer with a predetermined threshold and, based on the result of the comparison, gives information of the anticorrosive effect of the anticorrosive anode.

With this arrangement, the anticorrosive effect of the anticorrosive anode is evaluated by comparing the result of the measurement of the potential difference by the potentiometer with the threshold, and information of the evaluation result is provided by the notification unit. Thus, the state of the anticorrosive anode can be easily determined, so that the time for the inspection and the replacement of the anticorrosive anode can be easily detected.

In a preferred embodiment of the present invention, the microcomputer is programmed so as to compute information of the quality of the water contacting the metal component based on a potential difference between the primary reference electrode and the secondary reference electrode.

The potentials of the metal component and the anticorrosive anode are influenced by the consumption degree of the anticorrosive anode. In contrast, the potentials of the primary reference electrode and the secondary reference electrode are not influenced by the consumption degree of the anticorrosive anode. On the other hand, the potential difference between the primary reference electrode and the secondary reference electrode is influenced by the water quality. Therefore, the potential difference between the primary reference electrode and the secondary reference electrode can be used as fundamental information for determination of the water quality. Therefore, the provision of the primary reference electrode and the secondary reference electrode makes it possible to perform not only the measurement for the determination of the time for the inspection and the replacement of the anticorrosive anode but also the measurement for the determination of the quality of the water, for example, around the marine vessel propulsion device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
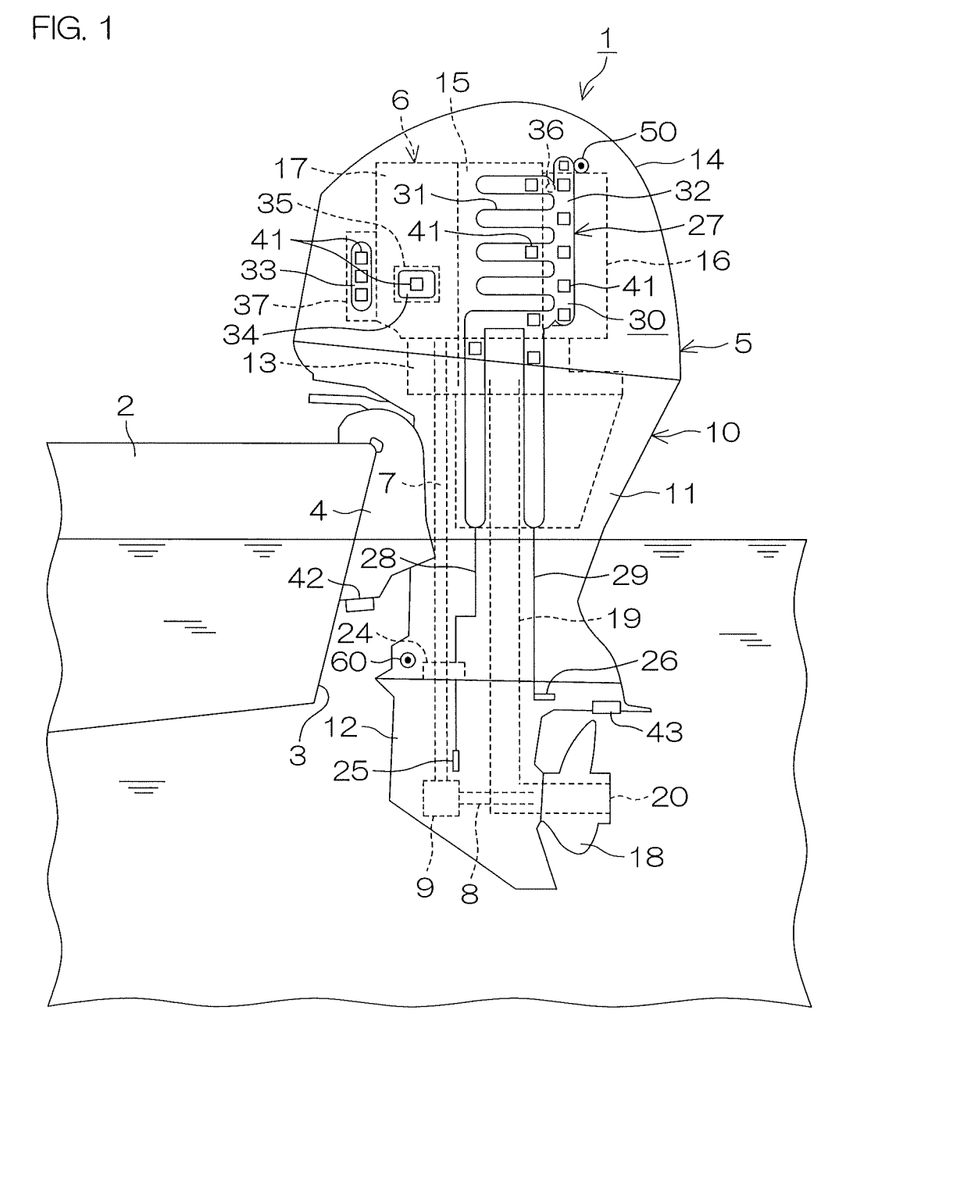
FIG. 1 is a conceptual diagram for describing the construction of a marine vessel propulsion device according to one preferred embodiment of the present invention.

FIG. 1 is a conceptual diagram for describing the construction of a marine vessel propulsion device according to one preferred embodiment of the present invention. In this preferred embodiment, the marine vessel propulsion device is in the form of outboard motor. The outboard motor 1 is typically attached to a stern board 3 of a marine vessel 2. The outboard motor 1 includes a bracket 4 for attachment thereof to the stern board 3, and an outboard motor body 5 connected to the bracket 4. The outboard motor body 5 includes an engine 6, a drive shaft 7, a propeller shaft 8, a gear mechanism 9, a casing 10, an exhaust guide 13, and an engine cover 14.

The engine 6 is a water-cooling internal combustion engine, and is housed in the engine cover 14. The engine 6 is supported by the exhaust guide 13, and includes a cylinder body 15, a cylinder head 16, and a crank case 17. The drive shaft 7 is connected to a lower end of a crank shaft (not shown) housed in the crank case 17, and extends downward.

The propeller shaft 8 anteroposteriorly extends, and a propeller 18 is connected to a rear end portion of the propeller shaft 8. The gear mechanism 9 is provided between a lower end of the drive shaft 7 and the propeller shaft 8. The gear mechanism 9 transmits the rotation of the drive shaft 7 to the propeller shaft 8.

The casing 10 includes an upper case 11 and a lower case 12. The drive shaft 7 extends through the upper case 11 to the lower case 12. The gear mechanism 9 and the propeller shaft 8 are housed in the lower case 12.

The exhaust guide 13 covers an inside space of the upper case 11 from above. The exhaust guide 13 is generally plate-shaped, and the engine 6 is mounted on an upper surface of the exhaust guide 13. The exhaust of the engine 6 is guided to the lower case 12 through the exhaust guide 13 and further through an exhaust passage 19, and guided into water through an exhaust port 20 provided at a rear end of the propeller 18.

The outboard motor body 5 includes a cooling device 27 for mainly cooling the engine 6. The cooling device 27 includes a water supply channel 28, a cooling water channel 30, a water drain channel 29, and a pump 24.

The cooling water channel 30 is a channel through which cooling water for cooling various portions of the engine 6 flows, and is referred to as water jacket. In this preferred embodiment, the cooling water channel 30 includes a cylinder cooling channel 31 formed in the cylinder body 15, a cylinder head cooling channel 32 formed in the cylinder head 16, and a crank case cooling channel 33 formed in a crank case cover 37. In addition, the cooling water channel 30 may include a cooling channel 34 for cooling a rectifier cover 35, and the like. A thermostat 36 is provided between the cylinder cooling channel 31 and the cylinder head cooling channel 32. According to the temperature of the cooling water flowing through the cooling water channel 30, the thermostat 36 switches a cooling water flow passage to prevent the supercooling of the engine 6. In this preferred embodiment, the thermostat 36 is provided above the cylinder head 16 at a position that permits a maintenance operation for replacement or the like with the engine cover 14 opened as required.

The water supply channel 28 guides the cooling water from a water intake port 25 to the cooling water channel 30. The water intake port 25 is located in water during use of the outboard motor 1. In this preferred embodiment, the water intake port 25 opens in an outer surface of the lower case 12. The pump 24 is provided in the water supply channel 28. The pump 24 is driven by the rotation of the drive shaft 7 to take in the surrounding water (sea water or fresh water) from the water intake port 25 to pump out the water into the cooling water channel 30. The water drain channel 29 guides the cooling water drained from the cooling water channel 30 to a water drain port 26. The water drain port 26 opens in an outer surface of the casing 10, e.g., in the outer surface of the lower case 12.

Anticorrosive anodes, i.e., anode metals 41, are provided in different portions of the cooling water channel 30. The anode metals 41 are spaced a distance of about 200 mm to about 300 mm from each other in the cooling water channel 30. The anode metals 41 each serve as a sacrificial anode to prevent the corrosion (so-called cathode corrosion) of metal components such as the cylinder body 15, the cylinder head 16, the crank case 17, and the exhaust guide 13. These metal components are made of, for example, an aluminum alloy. The anode metals 41 are each made of a metal less noble than the metal components, i.e., a metal having a lower natural potential or having a higher ionization tendency than the metal components. Specifically, the anode metals 41 may each be made of zinc. The anode metals 41 are electrically connected to the metal components, and are disposed in contact with the cooling water flowing through the cooling water channel 30. More specifically, the anode metals 41 contact the metal components, and are exposed to the cooling water channel 30.

In this preferred embodiment, anode metals 42, 43 are respectively attached to the bracket 4 and the casing 10. The bracket 4 and the casing 10 are each made of, for example, an aluminum alloy. The anode metals 42, 43 are made of a metal less noble than the aluminum alloy, e.g., zinc. The anode metals 42, 43 are respectively electrically connected to the bracket 4 and the casing 10, and are disposed in contact with the water contacting the bracket 4 and the casing 10. More specifically, the anode metals 42, 43 respectively contact the bracket 4 and the casing 10, and are disposed in contact with water around the outboard motor 1. Still more specifically, the anode metal 42 is attached to a lower end of the bracket 4, and is located in water during the use of the outboard motor 1. The anode metal 43 is attached to the lower case 12, and is located in water during the use of the outboard motor 1. That is, the anode metals 42, 43 are each located below the waterline during the use of the outboard motor 1.

The anode metals 41, 42, 43 are located in the same water in which the metal components to be protected from corrosion are located. Thus, the anode metals 41, 42, 43 are ionized to be corroded, thereby preventing the corrosion of the metal components. Therefore, the anode metals 41, 42, 43 are consumed during the use of the outboard motor 1 and, when the consumption reaches a predetermined level, the anode metals 41, 42, 43 require inspection or replacement. Sensor units 50, 60 are provided for detection of the time for the inspection and the replacement.

In this preferred embodiment, the sensor units 50, 60 include a sensor unit 50 for the anode metals 41 disposed in the cooling water channel 30. The sensor unit 50 is disposed, for example, near the thermostat 36. Further, the sensor units 50, 60 include a sensor unit 60 for the anode metal 42 disposed at the lower end of the bracket 4. The sensor unit 60 is disposed, for example, near a lower front end portion of the upper case 11. Since it is relatively easy to visually inspect the anode metal 43 attached to a rear end of the lower case 12, no sensor unit is provided for the anode metal 43 in this preferred embodiment. However, the sensor unit 60 may be used in common for the anode metals 42, 43 for detection of the time for the inspection and the replacement of the anode metals 42, 43, because the sensor unit 60 is located relatively close to the anode metal 43 in contact with the water contacting the anode metal 43.

Figure 2:
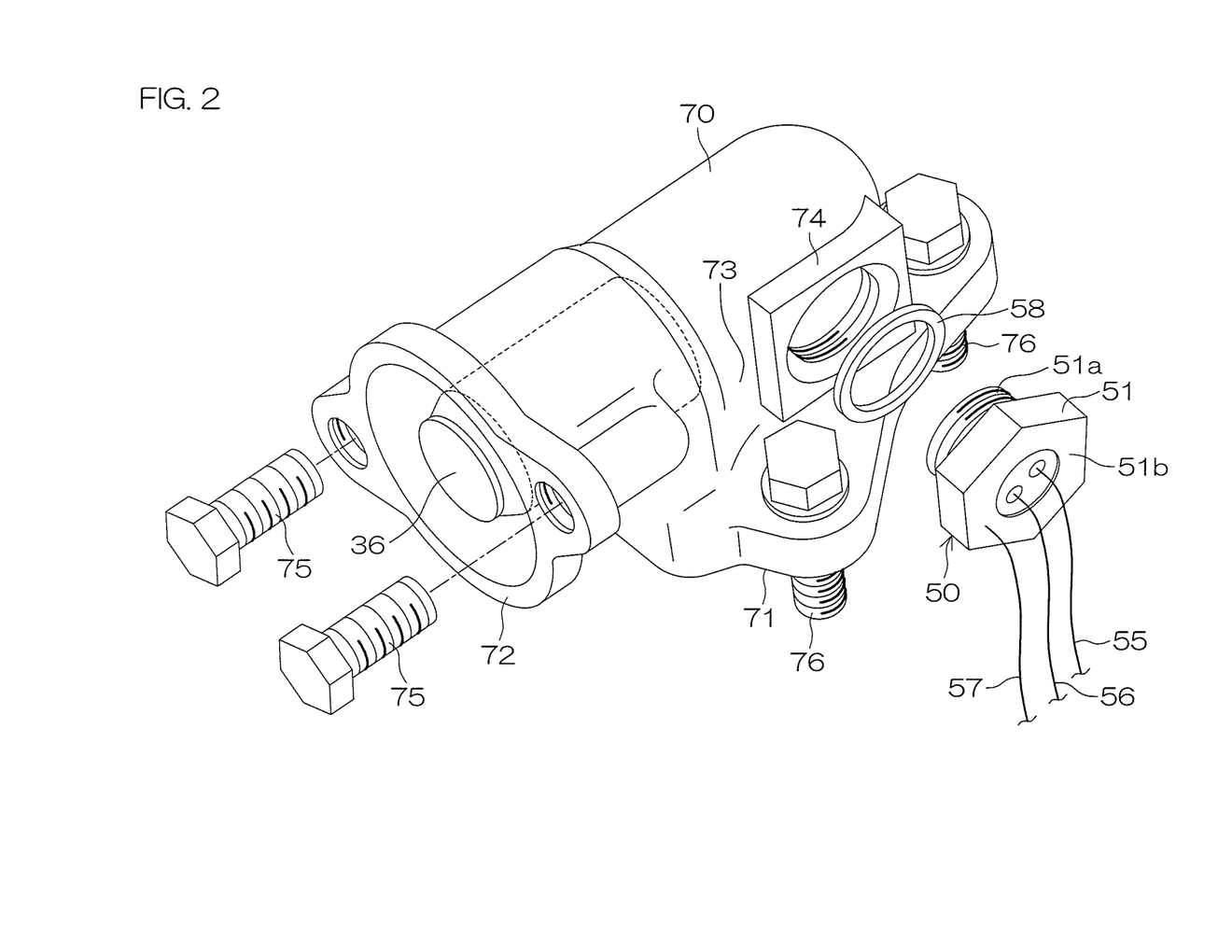
FIG. 2 shows an exemplary arrangement of a sensor unit for detection of the time for the inspection and the replacement of an anode metal.

FIG. 2 illustrates the sensor unit 50 located near the thermostat 36 by way of example. The sensor unit 50 is disposed, for example, in a joint 70 which connects the cylinder cooling channel 31 to the cylinder head cooling channel 32. An inlet end 71 of the elbow-shaped joint 70 is connected to the cylinder head cooling channel 32. An outlet end 72 of the joint 70 is connected to the cylinder cooling channel 31.

The joint 70 is a metal component made of the same metal material as the cylinder head 16 and the like (e.g., an aluminum alloy). The joint 70 has an L-shaped water channel, in which the thermostat 36 is provided. The thermostat 36 closes the water channel to prevent the cooling water from flowing into the cylinder block when the temperature of the cooling water is not higher than a predetermined temperature.

The joint 70 is fixed to the cylinder body 15 and the cylinder head 16 by bolts 75, 76 and, therefore, is detachable. The sensor unit 50 is disposed in a pipe wall 73 of the joint 70. More specifically, the pipe wall 73 has a thick wall portion 74, and a plug body 51 of the sensor unit 50 is threadedly engaged with the thick wall portion 74.

Figure 3:
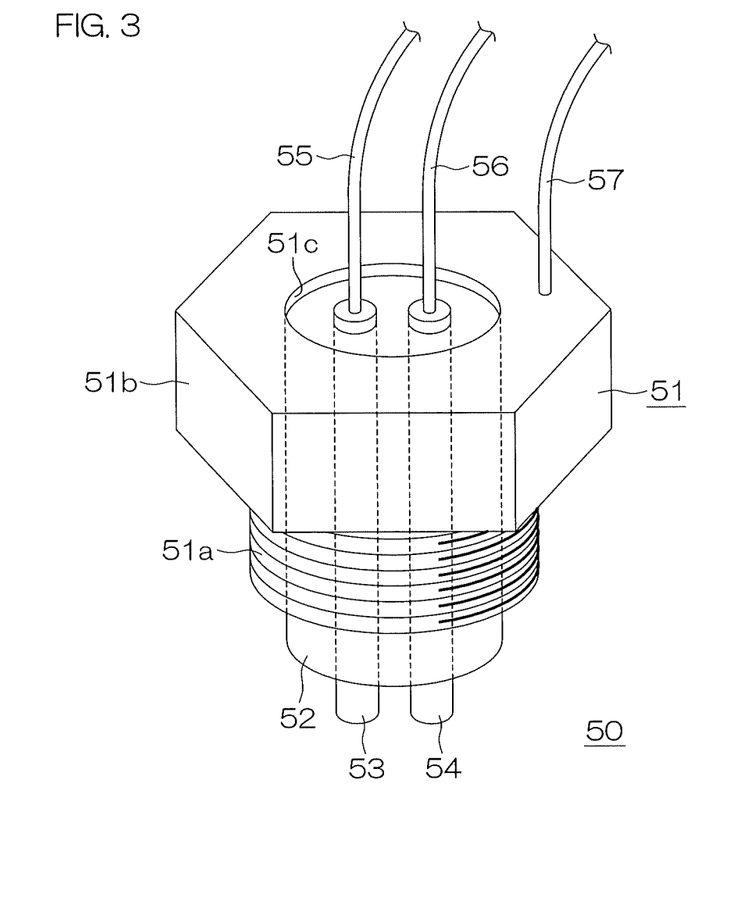
FIG. 3 shows the structure of the sensor unit byway of example.

FIG. 3 shows the construction of the sensor unit 50 disposed near the thermostat 36 byway of example. The sensor unit 50 includes the plug body 51, a primary reference electrode 53, and a secondary reference electrode 54.

The plug body 51 is made of a metal electrically connectable to the joint 70, typically the same metal material as the joint 70 (e.g., an aluminum alloy). The plug body 51 includes a screw portion 51a to be threadedly engaged with the thick wall portion 74 of the joint 70, and a nut-shaped head portion 51b combined with the screw portion 51a. A through-hole 51c extends through the head portion 51b and the screw portion 51a. The through-hole 51c is filled with a resin 52 serving as an insulator.

The primary reference electrode 53 and the secondary reference electrode 54 extend through the resin 52. The primary reference electrode 53 and the secondary reference electrode 54 are isolated from each other by the resin 52. The primary reference electrode 53 and the secondary reference electrode 54 are isolated from the plug body 51 by the resin 52. Inner ends of the primary reference electrode 53 and the secondary reference electrode 54 are exposed to the water channel in the joint 70, and disposed in contact with the cooling water flowing through the water channel.

Lead lines 55, 56 are respectively connected to outer ends of the primary reference electrode 53 and the secondary reference electrode 54. Further, another lead line 57 is connected to the plug body 51. In this preferred embodiment, the primary reference electrode 53 is made of the same metal material as the metal components to be protected from corrosion (e.g., an aluminum alloy). In this preferred embodiment, the secondary reference electrode 54 is made of the same material as the anode metals 41 (e.g., zinc).

With the screw portion 51a in threaded engagement with the thick wall portion 74 of the joint 70, the plug body 51 is electrically connected to the joint 70. With the joint 70 electrically connected to the cylinder head 16 and the cylinder body 15, the plug body 51 has the same potential as the metal components such as the cylinder head 16. As shown in FIG. 2, a seal member 58 (O-ring) is provided between the head portion 51b of the plug body 51 and the thick wall portion 74, thereby preventing leakage of the cooling water.

The thermostat 36 is disposed in the cooling water channel 30. Therefore, the sensor unit 50 disposed near the thermostat 36 can be disposed close to the anode metals 41 disposed in the cooling water channel 30. Specifically, where the anode metals 41 are spaced a distance of 200 mm to 300 mm from each other in the cooling water channel 30, the sensor unit 50 can be disposed at a position within a distance of 200 mm to 300 mm (preferably within a distance of 200 mm) from the anode metals 41. In addition, the joint 70 in which the thermostat 36 is disposed is a replaceable component, so that the sensor unit 50 can be advantageously provided without significantly modifying the design of the outboard motor 1.

Figure 4:
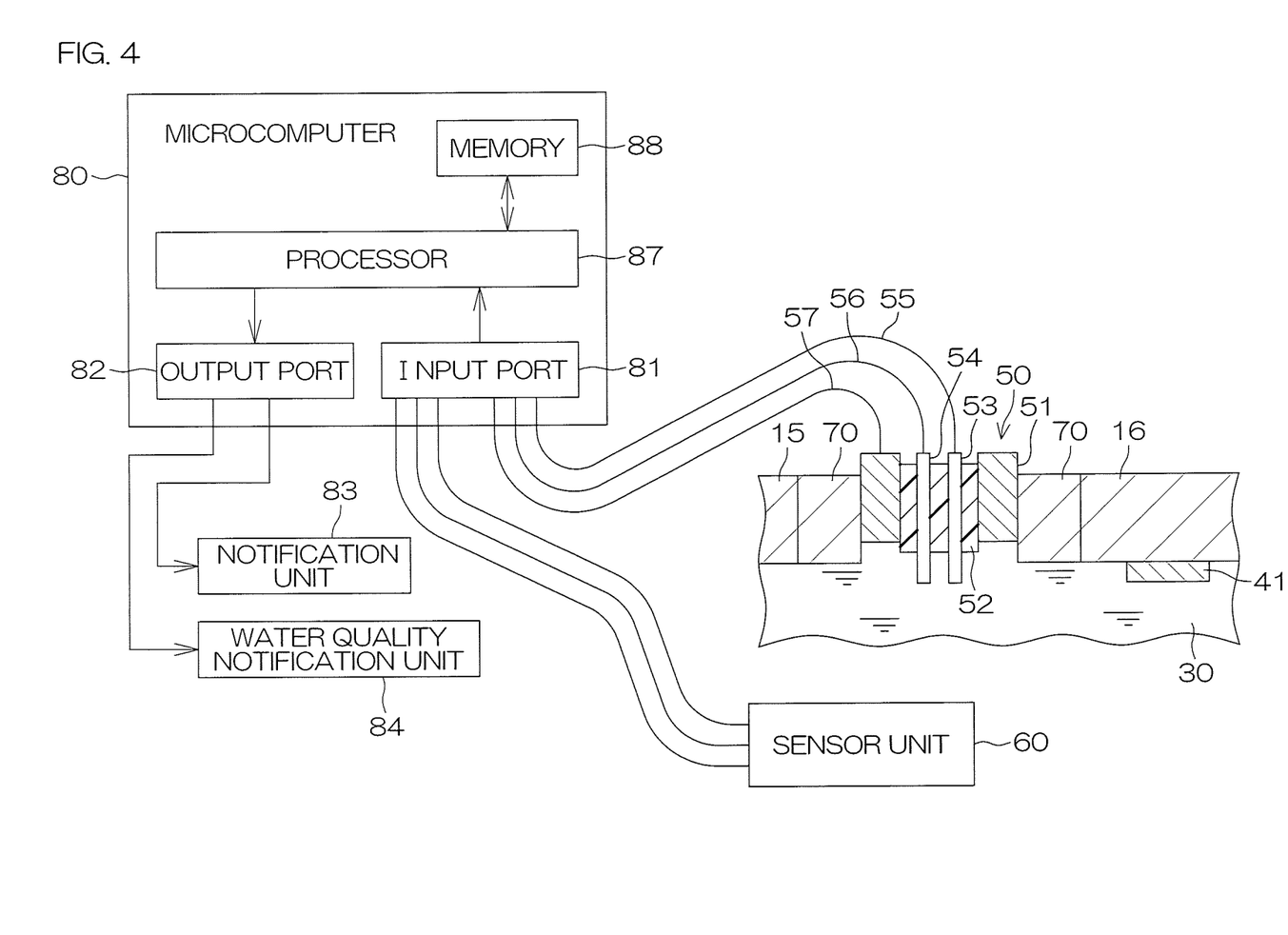
FIG. 4 is a block diagram for describing an electrical configuration for detection and notification of the time for the inspection and the replacement of the anode metal.

FIG. 4 is a block diagram for describing an electrical configuration for detection and notification of the time for the inspection and the replacement of the anode metals 41. The three lead lines 55, 56, 57 of the sensor unit 50 are connected to an input port 81 of a microcomputer 80. A notification unit 83 for giving information of the time for the inspection and the replacement of the anode metals 41 is connected to the microcomputer 80. The notification unit 83 may include a warning indicator connected to an output port 82 of the microcomputer 80. The warning indicator may include a warning lamp such as LED.

The three lead lines 55, 56, 57 of the sensor unit 50 respectively input a primary reference potential VP (which is the potential of the primary reference electrode 53), a secondary reference potential VS (which is the potential of the secondary reference electrode 54), and a metal component potential VM (which is the potential of the plug body 51) to the microcomputer 80. Based on these potentials, the microcomputer 80 determines whether or not the anode metals 41 should be inspected or replaced. Based on the result of the determination, the microcomputer 80 actuates the notification unit 83.

The microcomputer 80 includes a processor 87 and a memory 88. The processor 87 executes a program stored in the memory 88 to thereby provide various functions such as the determination on the inspection and the replacement of the anode metals 41.

Figure 5:
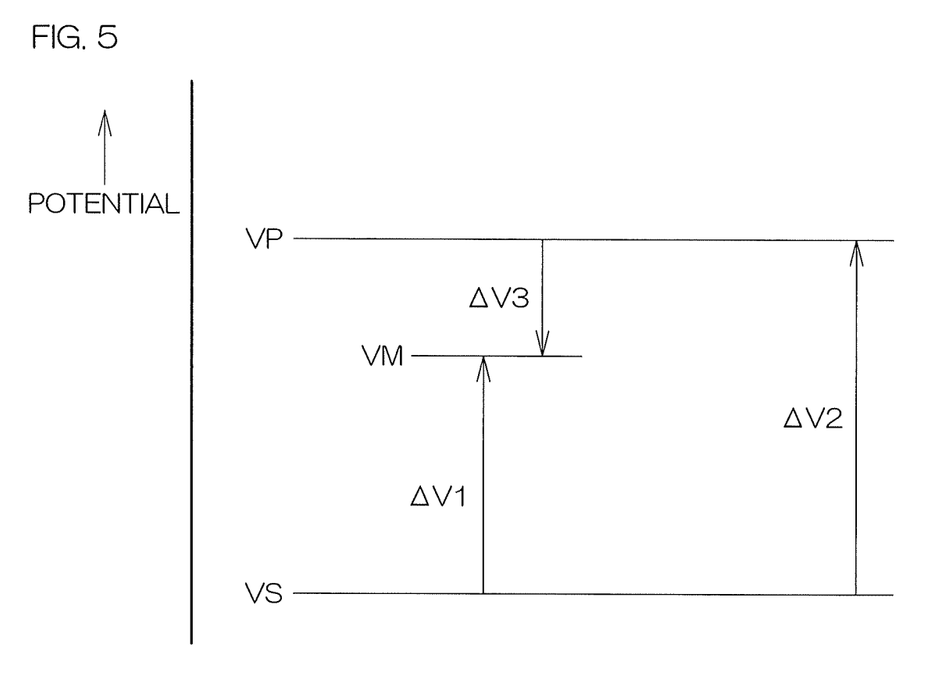
FIG. 5 is a diagram for describing a principal for the detection of the time for the inspection and the replacement of the anode metal.

FIG. 5 is a diagram for describing a principal for the detection of the time for the inspection and the replacement of the anode metals 41. The natural potential of the metal (e.g., the aluminum alloy) constituting the metal components such as the cylinder body 15 and the cylinder head 16 is higher than the natural potentials of the metal components connected to the anode metals 41. Further, the natural potentials of the metal components are higher than the natural potential of the metal (e.g., zinc) constituting the anode metals 41. That is, the constituent metal of the anode metals 41 is less noble than the constituent metal of the metal components. With the metal components connected to the anode metals 41, the potentials of the metal components and the potentials of the anode metals 41 are each a midpoint potential between the potentials of the constituent metals present independently.

Therefore, a relationship of the primary reference potential VP (corresponding to the natural potential of the constituent metal of the metal components present independently), the secondary reference potential VS (corresponding to the natural potential of the constituent metal of the anode metals present independently), and the metal component potential VM (corresponding to the potentials of the metal components) is as follows:

$$VS < VM < VP$$

A potential difference $\Delta V1$ (=VM−VS) of the metal component potential VM with respect to the secondary reference potential VS, a potential difference $\Delta V2$ (=VP−VS) of the primary reference potential VP with respect to the secondary reference potential VS, and a potential difference $\Delta V3$ (=VM−VP) of the metal component potential VM with respect to the primary reference potential VP satisfy the following expression:

$$\Delta V3 = \Delta V1 - \Delta V2$$

Where the anode metals 41 have a normal anticorrosive function with a smaller consumption degree, the potential difference $\Delta V3$ satisfies the following expression. That is, the potential difference $\Delta V3$ is smaller than a negative threshold $\alpha$ (<0).

$$\Delta V3 < \alpha < 0$$

If this expression is not satisfied, i.e., $\Delta V3 \geq \alpha$ ($\Delta V3 \geq 0$ inclusive), there is a possibility that the anode metals 41 have an abnormal anticorrosive function.

However, the potentials VP, VS, VM during the operation of the outboard motor vary depending upon the temperature of the water, the quality (salt concentration or the like) of the water, and other environmental factors. In the actual operation, therefore, whether the anticorrosive function is normal or abnormal is preferably determined based on the following expression:

$$\beta \leq \Delta V3 \leq \gamma$$

wherein $\beta<\alpha$ and $\alpha<\gamma<0$. A lower limit $\beta$ may be, for example, −500 mV, and an upper limit $\gamma$ may be, for example, −100 mV.

Figure 6:
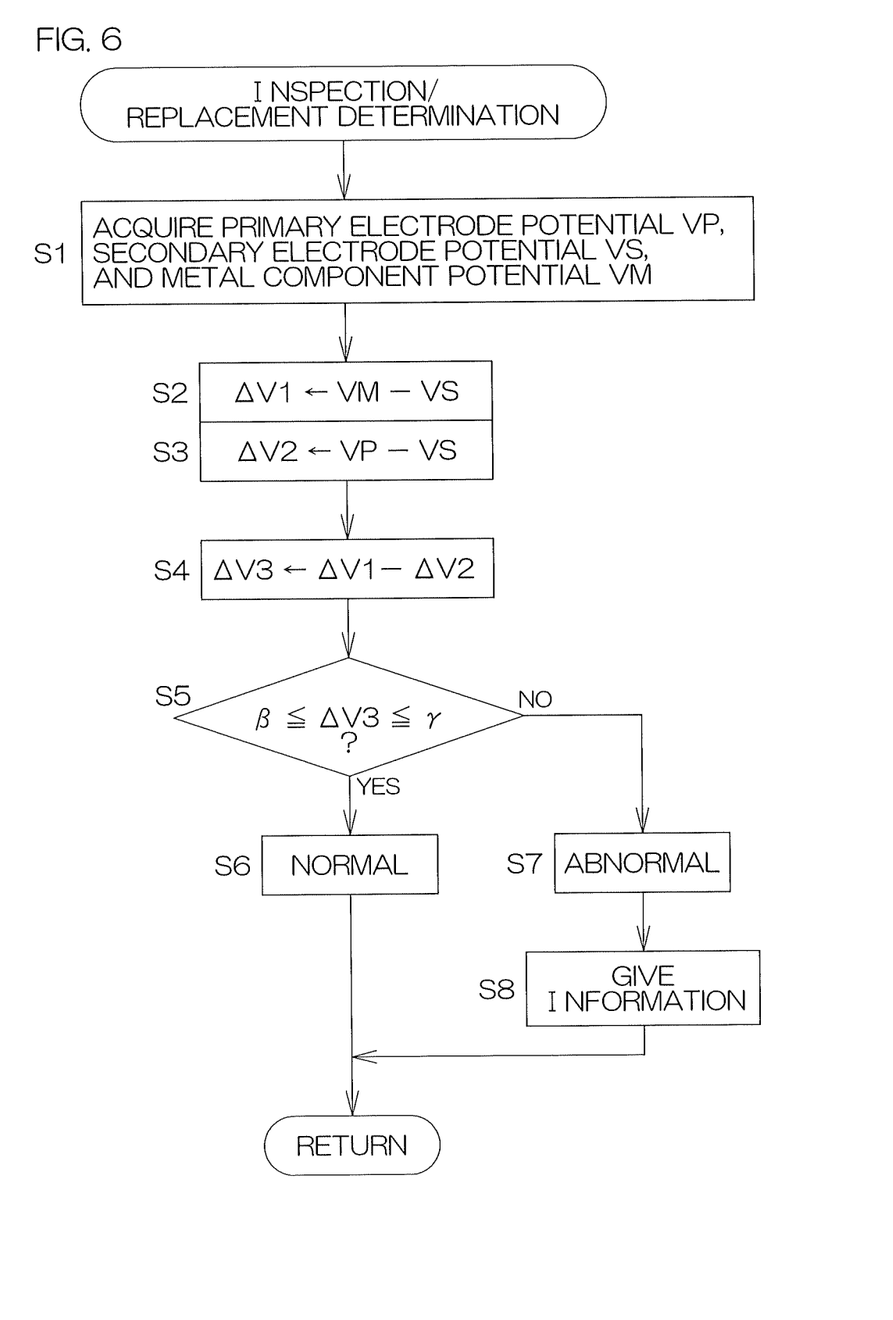
FIG. 6 is a flowchart for describing an exemplary process to be performed by a microcomputer.

FIG. 6 is a flowchart for describing an exemplary process to be performed by the microcomputer 80. More specifically, the processor 87 executes the program stored in the memory 88 to thereby perform the exemplary process shown in FIG. 6.

The microcomputer 80 acquires the primary reference potential VP, the secondary reference potential VS, and the metal component potential VM from the input port 81 (Step S1).

The microcomputer 80 has a function as a potentiometer for measuring the potential difference $\Delta V3$ (=VM−VP). Specifically, the microcomputer 80 determines the potential difference $\Delta V1$ (=VM−VS>0) of the metal component potential VM with respect to the secondary reference potential VS (Step S2), and determines the potential difference $\Delta V2$ (=VP−VS>0) of the primary reference potential VP with respect to the secondary reference potential VS (Step S3). Then, the microcomputer 80 determines the potential difference $\Delta V3$ (=$\Delta V1-\Delta V2$) by subtracting the potential difference $\Delta V2$ from the potential difference $\Delta V1$ (Step S4).

The microcomputer 80 determines whether the potential difference $\Delta V3$ falls within a range between the lower limit $\beta$ (e.g., −500 mV) and the upper limit $\gamma$ (e.g., −100 mV) (Step S5). If $\beta \leq \Delta V3 \leq \gamma$ (YES in Step S5), the microcomputer 80 determines that the anode metals 41 are in the normal state with the normal anticorrosive function (Step S6). If $\Delta V3<\beta$ or $\gamma<\Delta V3$ (NO in Step S5), the microcomputer 80 determines that the anode metals 41 are not in the normal state, i.e., are in an abnormal state requiring the inspection, the replacement, and other maintenance operation (Step S7). If the abnormal state is detected, the microcomputer 80 actuates the notification unit 83 (Step S8).

The microcomputer 80 may directly determine the potential difference $\Delta V3$ (=VM−VP, $\Delta V3<0$ in the normal state) of the metal component potential VM with respect to the primary reference potential VP. In this case, however, a higher performance microcomputer capable of directly reading a negative potential is required, correspondingly increasing the costs. Where the microcomputer 80 is configured and programmed to read the positive potential differences $\Delta V1$, $\Delta V2$ and compute the potential difference $\Delta V3$ as described above, in contrast, a simple and less expensive microcomputer can be used as the microcomputer 80.

In this preferred embodiment, as described above, the anode metals 41 are disposed in contact with the metal components (15, 16, and the like) of the outboard motor 1, and the anode metals 41 contact the water contacting the metal components. Thus, the anode metals 41 each serve as the sacrificial anode to provide the cathode anticorrosive effect, thereby preventing the corrosion of the metal components. On the other hand, the sensor unit 50 is attached to the metal components (15, 16, and the like) in order to detect the time for the inspection and the replacement of the anode metals 41. The sensor unit 50 includes the plug body 51 electrically connected to the metal components, and the primary reference electrode 53 and the secondary reference electrode 54 isolated from the metal components. The potential of the plug body 51, the potential of the primary reference electrode 53, and the potential of the secondary reference electrode 54 are inputted as the metal component potential VM, the primary reference potential VP, and the secondary reference potential VS, respectively, to the microcomputer 80. The microcomputer 80 computes the potential difference $\Delta V3$ of the metal component potential VM with respect to the primary reference potential VP, and determines whether the potential difference $\Delta V3$ falls within the predetermined range (between the lower limit $\beta$ and the upper limit $\gamma$). Thus, the microcomputer 80 determines whether the anode metals 41 have a normal anticorrosive effect. Based on the determination result, the microcomputer 80 controls the notification unit 83 and, if the anode metals 41 are in the abnormal state, gives information of the abnormal state.

As the outboard motor 1 is used, the anode metals 41 are corroded to be consumed. As the metal component potential VM correspondingly approaches the primary reference potential VP, the potential difference $\Delta V3$ approaches zero. Therefore, the consumption limit of the anode metals 41 can be monitored based on the potential difference $\Delta V3$ by properly setting the upper limit $\gamma$. Thus, the user is properly notified of the time for the inspection and the replacement of the anode metals 41 by the actuation of the notification unit 83. Since the time for the inspection and the replacement of the anode metals 41 can thus be easily detected, there is no need to disassemble the outboard motor 1 for the inspection of the anode metals 41. That is, the outboard motor 1 maybe disassembled, as required, when the replacement of the anode metals 41 is required.

It is also conceivable to detect an electric current (so-called anticorrosion current) flowing between the metal components and the anode metals 41 instead of monitoring the consumption degree of the anode metals 41 based on the potential difference $\Delta V3$. However, the electric current flowing between the metal components and the anode metals 41 is a minute electric current and, therefore, the consumption degree of the anode metals 41 cannot be sufficiently accurately monitored based on the minute electric current. This is because the detection of the minute electric current is difficult. In this preferred embodiment, the potential difference of the metal components with respect to the primary reference electrode 53 is employed and, therefore, the consumption degree of the anode metals 41 can be monitored with sufficient accuracy.

In this preferred embodiment, the primary reference electrode 53 is made of the same metal material as the metal components (e.g., aluminum alloy), and is isolated from the metal components and the anode metals 41. Therefore, the primary reference potential VP is higher than the metal component potential VM if the anticorrosive function of the anode metals 41 is normal. The primary reference potential VP and the metal component potential VM may vary depending upon the quality of the water, the temperature of the water, and other environmental factors. Even so, the potential difference $\Delta V3$ ($\beta \leq \Delta V3 \leq \gamma$) between the primary reference potential VP and the metal component potential VM can be properly provided as long as the anticorrosive function of the anode metals 41 is normal. Thus, the time for the inspection or the replacement of the anode metals 41 can be properly determined. Further, where the primary reference electrode 53 is made of the same metal material as the metal components, the potential variations of the primary reference electrode 53 and the metal components occur in the same manner due to the temperature and the electrical conductivity of the water and other environmental factors.

Therefore, the influence of the potential variations due to the environmental factors can be compensated for, so that the time for the inspection and the replacement of the anticorrosive anodes can be accurately determined without the need for special computation for correction. In addition, the primary reference electrode 53 is less expensive than special electrode materials.

As described above, the primary reference electrode 53 is made of the same metal material as the metal components or, alternatively, may be made of a metal material nobler than the metal components (e.g., titanium, silver (silver chloride electrode)). Even in this case, where the anticorrosive function of the anode metals 41 is normal, the primary reference potential VP is higher than the metal component potential VM and, therefore, the potential difference $\Delta V3$ (=VM−VP) can be properly provided.

In this preferred embodiment, the secondary reference electrode 54 isolated from the metal components, the anode metals 41, and the secondary reference electrode 54 is provided in addition of the primary reference electrode 53. In this preferred embodiment, the secondary reference electrode 54 is made of the same metal material as the anode metals 41. Therefore, the potential of the secondary reference electrode 54, i.e., the secondary reference potential VS, is lower than the potentials of the metal components and the anode metals 41 provided in contact with each other. Therefore, the potential differences $\Delta V1$, $\Delta V2$ of the metal component potential VM and the primary reference potential VP with respect to the secondary reference potential VS each have a positive value. By reading these positive potential differences $\Delta V1$, $\Delta V2$, the microcomputer 80 can compute the potential difference $\Delta V3$ which has a negative value in the normal state. Thus, a less expensive microcomputer having a simple function can be used as the microcomputer 80. This makes it possible to properly determine the time for the inspection and the replacement of the anode metals 41, while reducing the costs.

The secondary reference electrode 54 may be made of the same metal material as the anode metals 41 or, alternatively, may be made of a metal material less noble than the anode metals 41 (e.g., magnesium or the like). In this case, the potential difference $\Delta V3$ which has a negative value in the normal state can be determined based on the positive potential differences $\Delta V1$, $\Delta V2$.

In this preferred embodiment, as described above, the sensor unit 50 is disposed in a channel through which the cooling water flows in the cooling water channel 30 (water jacket), and the primary reference electrode 53 and the secondary reference electrode 54 contact the cooling water in the channel. Therefore, the potential differences can be properly measured to determine the time for the inspection and the replacement of the anode metals 41 disposed in the cooling water channel 30. Since it is difficult to externally check the state of the anode metals 41 incorporated in the cooling water channel 30, the determination of the time for the inspection and the replacement without the disassembling of the outboard motor 1 is highly beneficial to the user and the maintenance personnel.

Further, the sensor unit 50 is located near the anode metals 41 disposed in the cooling water channel 30. This makes it possible to measure the potential differences accurately indicating the consumption state of the anode metals 41. Thus, the time for the inspection and the replacement of the anode metals can be properly determined.

In this preferred embodiment, the bracket 4 and the casing 10 contacting the surrounding water are also provided as the metal components, and the anode metals 42, 43 for the prevention of the corrosion of these metal components are exposed to the outside of the casing 10. This prevents the corrosion of the bracket 4 and the casing 10. Further, the sensor unit 60 is provided to determine the time for the inspection and the replacement of the anode metal 42 (43). The sensor unit 60 has substantially the same structure as the sensor unit 50 (see FIG. 4). That is, the sensor unit 60 includes a primary reference electrode (53) and a secondary reference electrode (54) contacting the surrounding water. The primary reference electrode (53) is isolated from the bracket 4, the casing 10, and the anode metals 42, 43. The secondary reference electrode (54) is isolated from the bracket 4, the casing 10, the anode metals 42, 43, and the primary reference electrode (53). The potential of the primary reference electrode (53) (primary reference potential), the potential of the secondary reference electrode (54) (secondary reference potential), and the potential of the metal components (metal component potential) are inputted to the microcomputer 80 (see FIG. 4). The microcomputer 80 performs the signal processing and the computation on signals inputted from the sensor unit 60 in the same manner as on the signals inputted from the sensor unit 50 disposed in the cooling water channel 30 to determine the time for the inspection and the replacement of the anode metal 42 (43), and the notification unit 83 gives information of the result of the determination. The notification unit 83 is preferably configured to separately give information of the abnormality of the anode metals 41 disposed in the cooling water channel 30 and information of the abnormality of the anode metal 42 (43) disposed outside the outboard motor body 5.

The microcomputer 80 may compute information on the quality (pH, salt concentration (electrical conductivity)) of the water contacting the metal components based on a potential difference between the primary reference potential detected by the primary reference electrode 53 and the secondary reference potential detected by the secondary reference electrode 54. The potentials of the metal components and the anode metals 41 electrically connected to the metal components are influenced by the consumption of the anode metals 41. In contrast, the potentials of the primary reference electrode 53 and the secondary reference electrode 54 are not influenced by the consumption of the anode metals 41. On the other hand, these potentials are influenced by the quality of the water. The primary reference electrode 53 and the secondary reference electrode 54 are made of different metal materials and, therefore, the potentials thereof are changed differently due to the influence of the water quality. Thus, information of the water quality can be collected by utilizing the potential difference between the primary reference potential and the secondary reference potential. Therefore, the primary reference electrode 53 and the secondary reference electrode 54 can be utilized not only for the determination of the time for the inspection and the replacement of the anode metals 41 but also for the collection of the water quality information. The microcomputer 80 may control a water quality notification unit 84 (see FIG. 4), for example, according to the potential difference $\Delta V2$ between the primary reference electrode 53 and the secondary reference electrode 54. The water quality notification unit 84 may have one or more indicators (LEDs or the like). Thus, the water quality information can be given to the user. For example, the microcomputer 80 may compare the potential difference $\Delta V2$ with a plurality of thresholds, and display different levels of water quality information according to the result of the comparison. Further, the microcomputer 80 may collect and store the potential difference $\Delta V2$ between the primary reference electrode 53 and the secondary reference electrode 54 or the result of the comparison of the potential difference ΔV2 with the plurality of thresholds as the water quality information in the internal memory 88 or an external memory. As required, the collected water quality information may be read out of the memory 88 or the like for use.

Further, the microcomputer 80 may correct the thresholds β, γ to be used for the determination of the time for the inspection and the replacement of the anode metals based on the detected water quality information.

While the preferred embodiment of the present invention has thus been described, the invention can be embodied in some other ways. In the preferred embodiment described above, the metal component potential VM is measured, but an anode metal potential may be measured instead of or in addition to the metal component potential VM, and compared with the primary reference potential VP in substantially the same manner as the metal component potential VM described above.

In the preferred embodiment described above, the outboard motor is used as an example of the marine vessel propulsion device. Similarly, a marine vessel propulsion device other than the outboard motor maybe provided with the arrangement for the easy detection of the time for the inspection and the replacement of the anticorrosive anodes. Examples of the other form of marine vessel propulsion device include an inboard-outdrive motor and a water jet propulsion device.

In the preferred embodiment described above, the function of the potentiometer is provided by the microcomputer 80 by way of example, but some other form of potentiometer may be employed for the measurement of the potential difference between the primary reference potential VP and the metal component potential VM.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel propulsion device having a metal component in contact with water, the marine vessel propulsion device comprising:
    an anticorrosive anode which includes a metal material less corrosion-resistant than the metal component, and is electrically connected to the metal component, and is disposed in contact with the water contacting the metal component;
    a primary reference electrode isolated from the metal component and the anticorrosive anode, and disposed in contact with the water contacting the metal component; and
    a potentiometer that detects a potential difference of the metal component or the anticorrosive anode with respect to the primary reference electrode.

2. The marine vessel propulsion device according to claim 1, wherein the primary reference electrode is made of a metal material which has a higher potential than a material of the metal component when the potential difference of the metal component with respect to the primary reference electrode is within a predetermined range.

3. The marine vessel propulsion device according to claim 2, wherein the predetermined range is from −500 mV to −100 mV.

4. The marine vessel propulsion device according to claim 2, further comprising:
    a secondary reference electrode which
        is made of a metal material having a lower potential than the material of the metal component and that of the anticorrosive anode when the potential difference of the metal component with respect to the primary reference electrode is within the predetermined range,
        is isolated from the metal component, the anticorrosive anode and the primary reference electrode, and
        is disposed in contact with the water contacting the metal component,
    wherein the potentiometer includes a microcomputer programmed to detect a first potential difference, which is a potential difference of the primary reference electrode with respect to the secondary reference electrode, and a second potential difference, which is a potential difference of the metal component or the anticorrosive anode with respect to the secondary reference electrode, and compute the potential difference of the metal component or the anticorrosive anode with respect to the primary reference electrode based on the first and second potential differences.

5. The marine vessel propulsion device according to claim 4, wherein the secondary reference electrode contains a same metal material as a material of the anticorrosive anode, or a metal material that is less corrosion-resistant than the material of the anticorrosive anode.

6. The marine vessel propulsion device according to claim 4, wherein the secondary reference electrode is made of a same metal material as a material of the anticorrosive anode.

7. The marine vessel propulsion device according to claim 4, wherein the microcomputer is programmed so as to compute information of quality of the water contacting the metal component based on the first potential difference between the primary reference electrode and the secondary reference electrode.

8. The marine vessel propulsion device according to claim 1,
    wherein the metal component includes a cooling water channel through which cooling water flows to cool an engine,
    wherein the primary reference electrode is disposed in contact with the cooling water flowing through the cooling water channel.

9. The marine vessel propulsion device according to claim 8,
    wherein the anticorrosive anode includes an anode fixed to the metal component in contact with the cooling water flowing through the cooling water channel,
    wherein a distance between the primary reference electrode and said anode is within a predetermined range.

10. The marine vessel propulsion device according to claim 9, wherein the predetermined range is within 500 mm.

11. The marine vessel propulsion device according to claim 1,
    wherein the metal component includes a bracket or a casing which contacts water surrounding the marine vessel propulsion device during sailing of a marine vessel in which the marine vessel propulsion device is installed,
    wherein the primary reference electrode is disposed in contact with the surrounding water contacting the bracket or the casing.

12. The marine vessel propulsion device according to claim 1, further comprising a notification unit that compares the potential difference detected by the potentiometer with a predetermined threshold, and, based on a result of the comparison, gives information of an anticorrosive effect of the anticorrosive anode.

13. The marine vessel propulsion device according to claim 1, wherein the primary reference electrode contains a same metal material as a material of the metal component, or a metal material that is more corrosion-resistant than the material of the metal component.

14. The marine vessel propulsion device according to claim 1, wherein the primary reference electrode is made of a same metal material as a material of the metal component.

\* \* \* \* \*